United States Patent
Hermansen et al.

(10) Patent No.: US 7,832,313 B2
(45) Date of Patent: Nov. 16, 2010

(54) DEVICE AND METHOD FOR THROUGH-CUTTING OF AN EXTRUDED ICE MASS

(75) Inventors: Carsten Hermansen, Aarhus V (DK); Steen Sprogoe Petersen, Hoejbjerg (DK)

(73) Assignee: Tetra Laval Holding & Finance S.A., Pully (CH)

( * ) Notice: Subject to any disclaimer, the term of this patent is extended or adjusted under 35 U.S.C. 154(b) by 348 days.

(21) Appl. No.: 10/523,924

(22) PCT Filed: Jul. 29, 2003

(86) PCT No.: PCT/DK03/00515

§ 371 (c)(1), (2), (4) Date: Mar. 28, 2005

(87) PCT Pub. No.: WO2004/012519

PCT Pub. Date: Feb. 12, 2004

(65) Prior Publication Data

US 2006/0101956 A1    May 18, 2006

(30) Foreign Application Priority Data

Aug. 5, 2002    (DK)    ................................ 2002 01177

(51) Int. Cl.
*A23G 9/28*    (2006.01)
*B26D 1/06*    (2006.01)
*B26D 5/08*    (2006.01)

(52) U.S. Cl. .................. 83/23; 83/42; 83/155; 83/236; 83/350; 83/356.2; 83/623; 83/694; 83/932; 425/289; 425/308; 426/518

(58) Field of Classification Search .................. 83/623, 83/694, 13, 23, 42, 51, 155, 236, 257, 350, 83/355, 356.2, 524, 530, 600, 618, 697, 932; 65/334; 425/164, 308, 289, 527, 553; 426/518
See application file for complete search history.

(56) References Cited

U.S. PATENT DOCUMENTS 845,331 A * 2/1907 Briede .......................... 83/277

(Continued)

FOREIGN PATENT DOCUMENTS

EP    0 601 194 A1    6/1994

(Continued)

OTHER PUBLICATIONS

Danish Search Report.

*Primary Examiner*—Clark F. Dexter
(74) *Attorney, Agent, or Firm*—Roberts Mlotkowski Safran & Cole, P.C.

(57) ABSTRACT

A device for through-cutting of an extruded ice mass, which has a first knife which is reciprocably arranged in a transverse first plane immediately after the outlet of the nozzle and arranged with a first length of stroke and a second knife which is reciprocably arranged in a plane which is parallel to the first plane and which is arranged immediately below the first knife with respect to the flow direction out of the nozzle, the second knife is arranged with a second stroke length which is smaller than the first stroke length, and a control for producing simultaneous reciprocation of the first and the second knife. Hereby, a shearing is achieved which is more precise and commonly applicable for manufacturing of ice cream portions by an automated production of ice cream products.

14 Claims, 4 Drawing Sheets

U.S. PATENT DOCUMENTS

| | | | |
|---|---|---|---|
| 2,648,383 A * | 8/1953 | Hahn | 83/623 |
| 2,926,557 A * | 3/1960 | Ford | 83/623 |
| 3,822,623 A | 7/1974 | Wight | |
| 3,850,607 A * | 11/1974 | Cook | 65/334 |
| RE28,345 E * | 2/1975 | Breetvelt | 83/157 |
| 4,015,967 A * | 4/1977 | Ward, Jr. | 65/133 |
| 4,778,365 A | 10/1988 | Archer | |
| 4,850,845 A | 7/1989 | Hicks | |
| 4,961,773 A * | 10/1990 | Takahara et al. | 65/174 |
| 5,077,074 A * | 12/1991 | Van Lengerich | 426/549 |
| 6,453,784 B1 | 9/2002 | Cotteverte et al. | |
| 6,663,374 B1 * | 12/2003 | Marable et al. | 425/131.1 |
| 2004/0187708 A1 * | 9/2004 | Waldstrom | 99/455 |

FOREIGN PATENT DOCUMENTS

| | | |
|---|---|---|
| JP | 3-80051 A | 4/1991 |
| SU | 1692502 A1 | 11/1991 |
| WO | 94/10855 A1 | 5/1994 |
| WO | WO 03/053154 A1 | 7/2003 |

\* cited by examiner

DEVICE AND METHOD FOR THROUGH-CUTTING OF AN EXTRUDED ICE MASS

BACKGROUND OF THE INVENTION

1. Field of the Invention

The present invention relates to a device and a method for cutting of an extruded ice mass which is extruded out of a nozzle, comprising cutting means which immediately after the nozzle cuts up the extruded ice mass into product pieces which fall down on a receiving device for further processing.

2. Description of Related Art

By production of ice-cream lollies or other ice products, it is common to extrude an ice cream with high viscosity out of a nozzle, where the extruding ice mass with a predetermined time interval is cut-off and received on a conveyer for further handling. The nozzle is shaped with respect to the form that the ice product shall be given.

A device for through-cutting is known in which a metal wire is passed through the extruding ice mass, whereby the extruding portion is separated from the ice mass on the way out of the nozzle. This metal wire is typically a hot wire, so that the through-passing of the wire progresses fast and easy.

But, this through-cutting however is not suitable for through-cutting of ice cream containing solid ingredients, such as nuts, berries or the like as the wire does not have a cutting edge, and the ingredients cannot be through-cut by through-melting.

Alternatively, a device is known where a rotating knife cuts through the ice mass. Hereby, the relatively solid ice mass can be cut through even if it contains solid ingredients, such as nuts, berries or the like.

However this through-cutting implies that the cut-off portion of ice cream is influenced by a laterally oriented motional impulse with the effect that the portion does not necessarily fall onto the underlying conveyer. This makes the further handling of the ice cream portions difficult as they are delivered on the underlying conveyer in a disordered and unpredictable pattern. This has shown to be a hindrance in conjunction with automation of the production of such ice cream products.

SUMMARY OF THE INVENTION

On this background, it is the object of the invention to provide a device and a method for through-cutting, which secures a uniform delivery of the cut-off ice cream portions on the conveyer below the extrusion nozzle.

The invention relates to a device and a method of the introductory mentioned kind, where the cutting means comprises a first knife which is reciprocably arranged in a transverse first plane immediately after the outlet of the nozzle and arranged with a first stroke length, and a second knife which is reciprocably arranged in a plane which is parallel to the first plane and which is arranged immediately below the first knife with respect to the flow direction out of the nozzle, the second knife is arranged with a second stroke length which is smaller than the first stroke length, and means for simultaneous reciprocation of the first and the second knife.

Hereby, a through-shearing can be achieved of the ice mass portion which has been extruded out of the nozzle since the last through-shearing, without influencing the cut-off portion by a disturbing lateral impulse which causes it to be unpredictable as to if or where it falls onto the conveyer. The upper first knife performs a complete through-cutting, and the second knife immediately below cuts halfway through the ice mass from the opposite side simultaneously with the first knife being guided through the ice cream mass. Hereby, the impulse with which the first knife influences the cut-off piece is counteracted by an oppositely directed impulse from the second knife. Thus, the two oppositely directed influences will essentially neutralize each other and the resulting impulse will essentially be neutral, so that the cut-off portion essentially falls straight down onto the underlying conveyer. Furthermore, a device and a method according to the invention will be suitable in connection with production of ice cream products containing solid ingredients because these are cut as the knives are guided with high velocity in the through-cutting.

Thus, the device preferably comprises means for control of the movements of the knives, insuring guidance of the first knife in a first transverse stroke which consists in a complete through-cutting of the ice mass, and that the second knife, in a simultaneous movement, is guided partly through the ice mass in an oppositely directed stroke of which the direction of movement is opposite the direction of movement of the first stroke. In that the ice mass continuously is extruded with an essentially constant flow velocity out of the nozzle, the thickness of the cut-off pieces will be uniform and the distance on the conveyer will be essentially identical if the device is activated with a constant frequency. This frequency can preferably be adjusted with respect to the actual product, which is to be produced by the machine.

In a preferred embodiment of the invention, the second stroke length of the second knife is half of the first stroke length. Furthermore, the edges of the knives are preferably V-shaped, so that the knives can easily slide against each other without risk of mutual collision.

The first and the second knives are, in the preferred embodiment, arranged on parallel guides of a frame in the means of control with opposing inactive positions arranged on each side of a path of the ice mass which is extruded from the nozzle. Hereby, a construction of the device is provided which is plain and mechanically simple and also easily is retrofitted on existing equipment as a replacement for other types of cutting devices.

In the preferred embodiment of a device according to the invention, the first and the second knives are eccentrically connected to rotor means which by coupling means are attached to rotating drive means, whereby a rotational movement from the drive means is transferred to the rotor means and is transformed into a translational movement of the knives. Furthermore, the coupling means may comprise a pneumatically or electrically activatable coupling and the means of control comprise a pneumatic or electromagnetic control for engaging the coupling for performing a through-cutting in dependency of the flow velocity of the ice mass out from the nozzle. Hereby, a mechanically simple and reliable through-cutting device is achieved. The coupling means function both as coupling by which the knives by engagement are set in motion and as a brake to stop the movement of the knives. It is by the invention realized that the coupling means can be either pneumatically, electrically or electromagnetically activated. However, it is important to use a hygienic reliable drive means in connection with production of food products.

In the following, the invention is further described referring to the drawings.

DETAILED DESCRIPTION OF THE INVENTION

Figure 1:
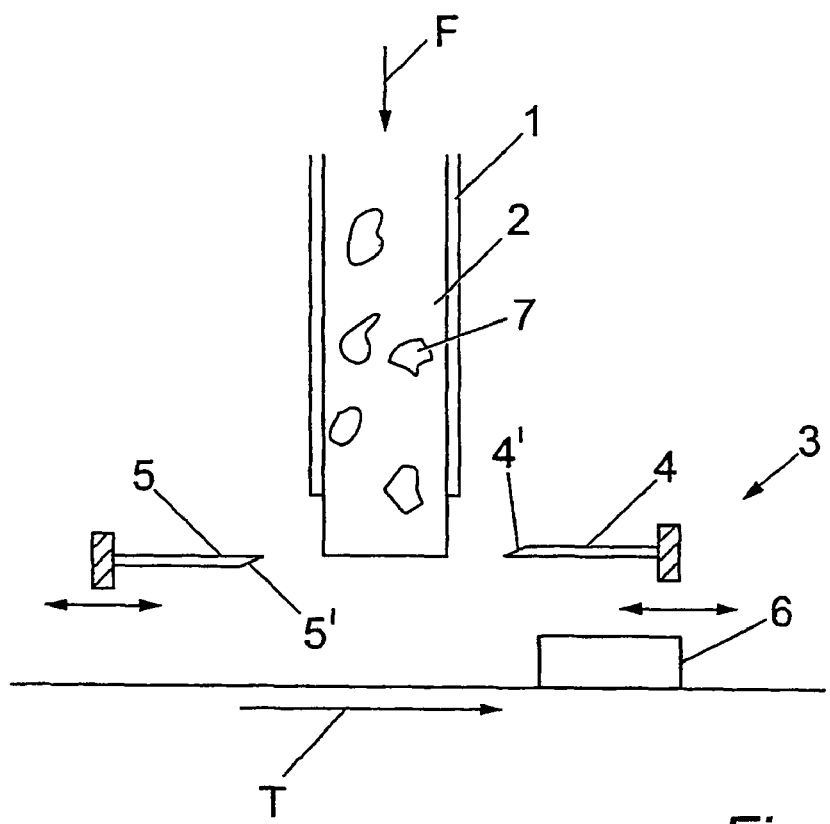
FIG. 1 shows a schematic side view of a device for through-cutting of an extruded ice mass according to the invention with the knives in an inactive position.
Figure 2:
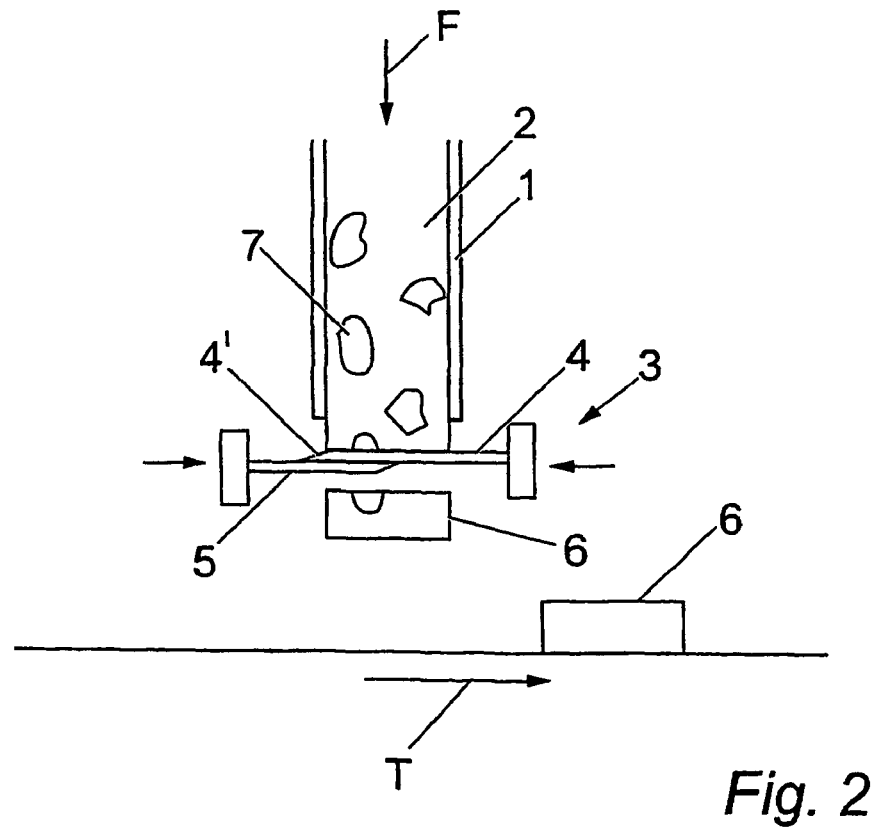
FIG. 2 shows the same with the knives in a projected position.

FIGS. 1 and 2 show a device for through-cutting by a shearing of an extruded ice mass according to a preferred embodiment of the invention. An ice cream mass 2 is shaped by extrusion out of a nozzle 1, which comprises a pipe section with a predetermined cross-sectional shape. The ice cream 2, having a high viscosity, is forced out of the nozzle 1 with an essentially constant flow velocity F. Immediately after the outlet of the nozzle 1, a through-cutting device 3 is arranged which comprises an upper first knife 4 and a lower second knife 5. The two knives are arranged in parallel so they can be moved in separate and planes, which preferably are orthogonal with respect to the flow direction of the ice mass, however in such a way that the cutting planes of the knives are essentially the same. In FIG. 1, the knives 4, 5 are shown in their inactive positions, and in FIG. 2, they are shown in their projected positions. As shown in the figures, the ice cream 2 may contain solid ingredients 7, such as berries or nuts, for example, which is desirable in relation to producing variants of ice cream products.

As it is apparent from FIG. 2, the first knife 4 is guided in a first transverse stroke which consists in a complete through-cutting of the ice mass 2, and the second knife 5 is guided in a simultaneous movement partly through the ice mass in an oppositely directed stroke of which the direction of movement is opposite the direction of movement in the first stroke. Together, the knives 4, 5 are, in this way, performing a sort of through-shearing of the extruding ice cream from the nozzle 1. By extruding the ice mass 2 continuously out of the nozzle with an essentially constant flow velocity F, the thickness of the cut-off pieces 6 will be uniform and the distance on the conveyer T will be essentially identical if the device 3 is activated with a constant frequency. This frequency can preferably be adjusted with respect to the actual product, which is to be produced by the machine.

Figure 3:
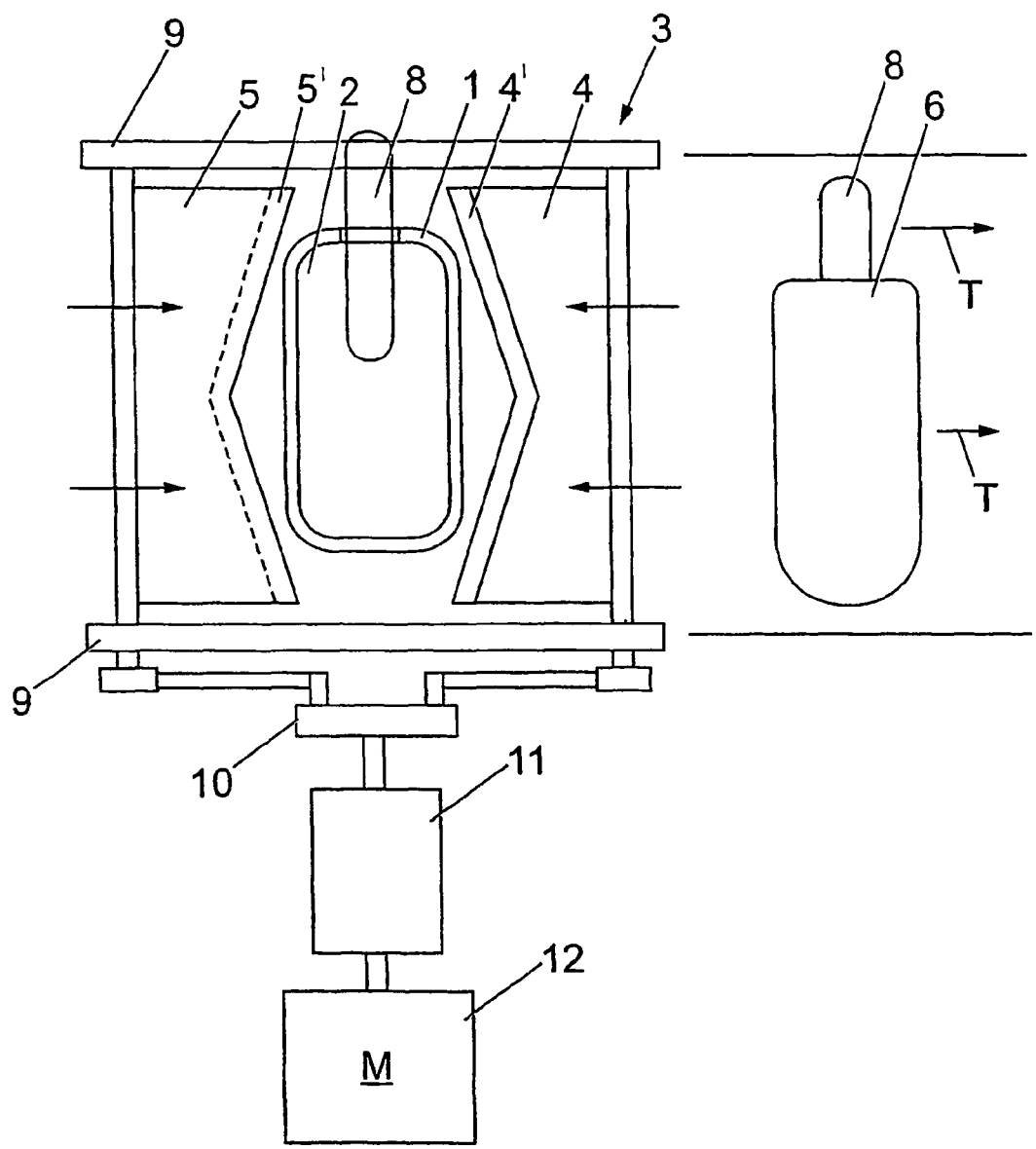
FIG. 3 shows a schematic top view of the device with the knives in a retracted, inactive position.

As it is indicated in FIG. 2, the second stroke length of the second knife 5 is about half of the stroke length of the first knife 4. Furthermore, the edges 4', 5' of the knives 4, 5 are preferably V-shaped as shown in FIG. 3 so that the knives 4, 5 can easily slide against each other without risk of mutual collision. Thereby, there is no risk as well that the knives are sliding askew in the guiding frame 9 as a result of uneven resistance in the ice cream, for example.

The first knife and the second knife are, in the preferred embodiment, arranged in parallel guides on a frame 9 of the means of control with opposing inactive positions arranged on each side of the ice mass 2 which is extruded from the nozzle 1. As shown in FIG. 3, there may, in connection with the nozzle 1, be means for insertion of an ice cream lolly stick 8 in the ice mass 2, e.g., through an opening 13 in the nozzle 1 immediately before the outlet (see, FIGS. 4 and 5).

As shown in FIG. 3, the first and the second knives 4, 5 are eccentrically connected to rotor means 10 which by coupling means 11 are attached to rotating drive means 12 whereby a continuous rotational movement from the drive means 12 is transferred to the rotor means 10 and transformed into a translational movement of the knives 4, 5. The coupling means 11 could, in the example shown, be a pneumatically activatable coupling which is attached to control means (not shown), which comprises an electric or pneumatic control for attaching the coupling 11 for performing a through-cutting in dependency on the flow velocity F of the ice mass 2 out from the nozzle 1.

Figure 4:
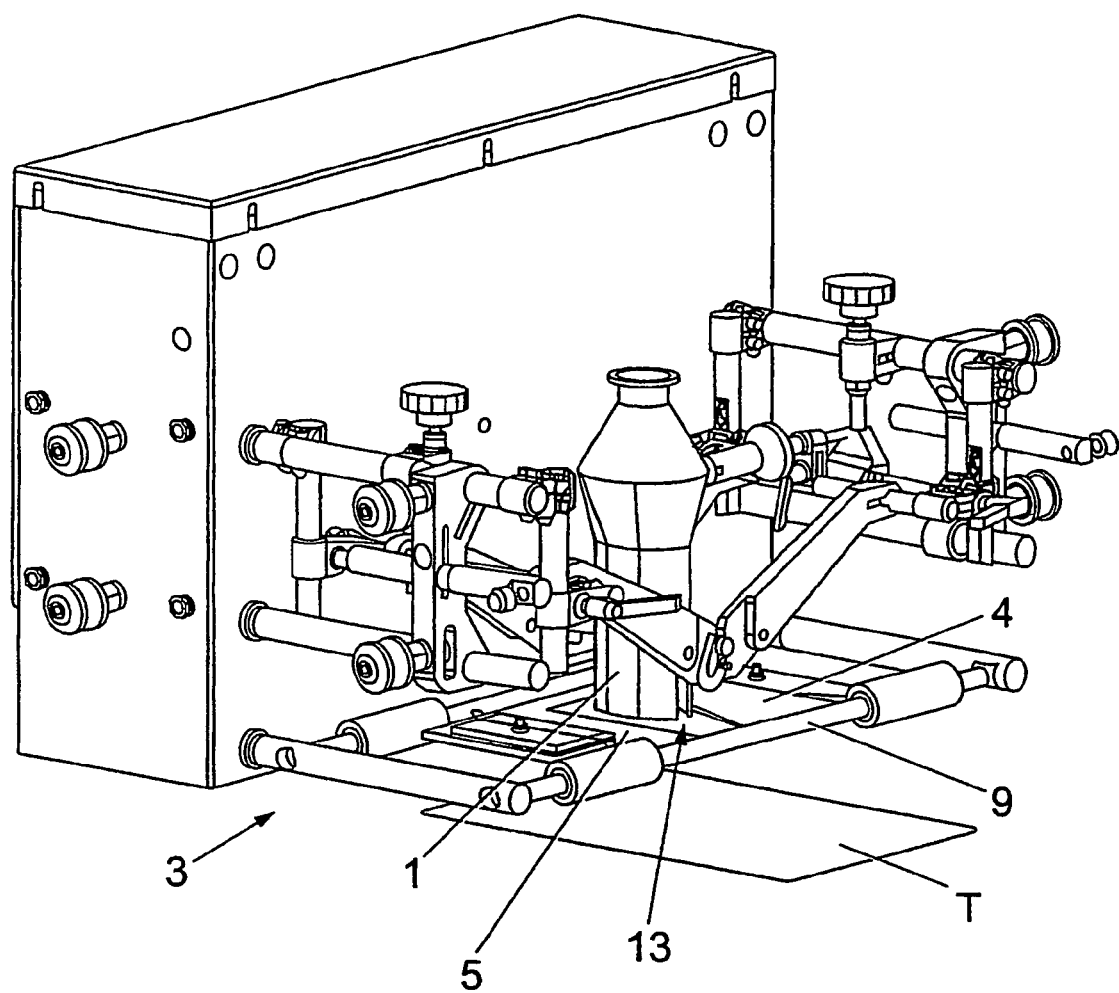
FIG. 4 shows a perspective view of a preferred embodiment of a device according to the invention mounted in the apparatus.

In FIG. 4, the device in a preferred embodiment is shown in perspective. As it appears from FIG. 4, the cutting device 3 is arranged below the nozzle 1. As it appears from FIG. 4, the upper knife 4 and the lower knife 5 are slidably arranged on side guides of the frame 9. Below is arranged the conveyer T onto which the cut-off products are received and transported onward for further processing. As it is seen, the nozzle 1 is equipped with a slot 13 through which an ice cream lolly stick can be hacked into the ice cream in the nozzle immediately before the outlet. This mounting of an ice cream lolly stick in the ice cream is naturally synchronized with the flow velocity F and the frequency of the through-cutting by the device 3, so that it is ensured that an ice cream lolly stick 8 is mounted in each cut-off ice product 6.

Figure 5:
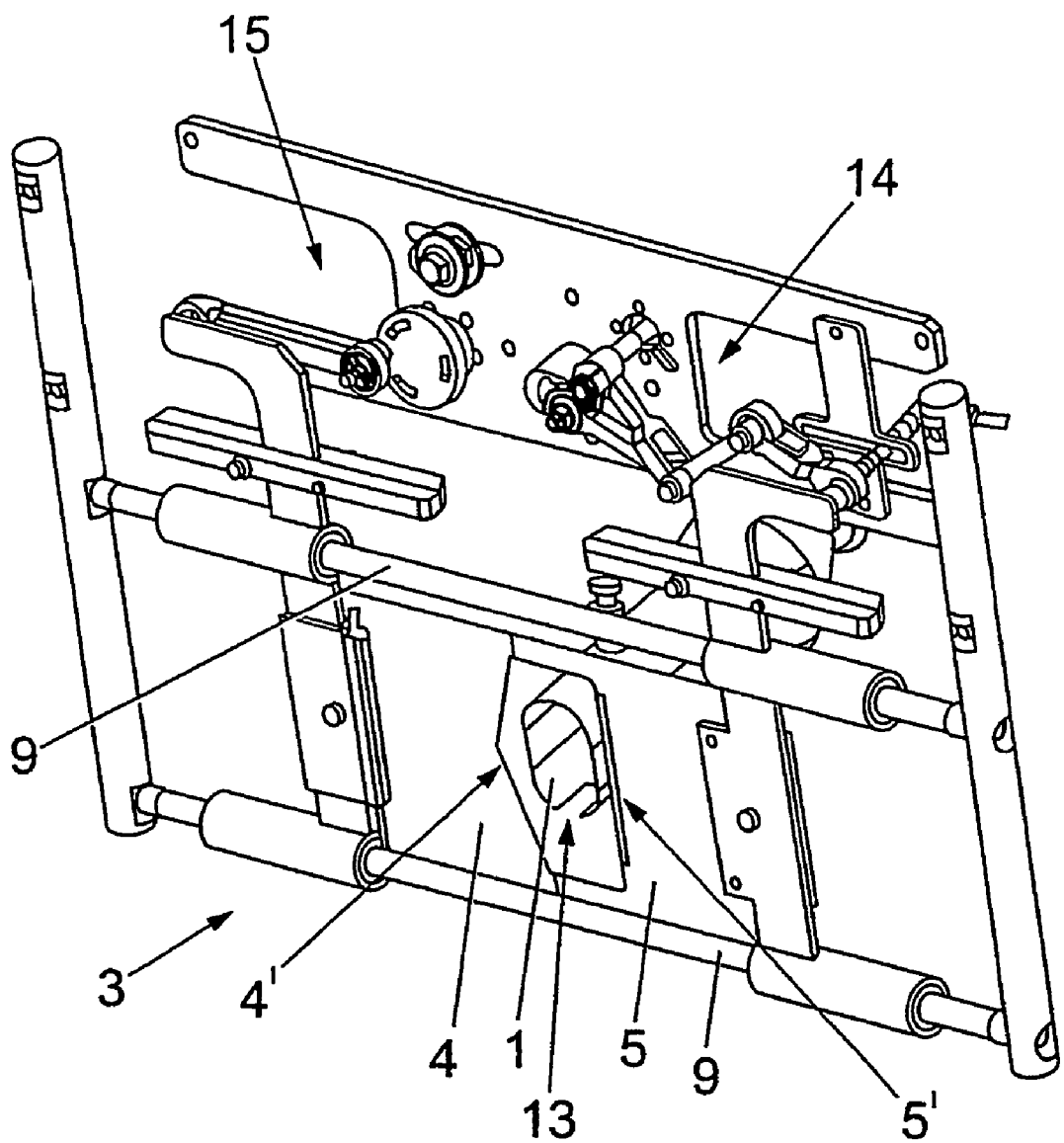
FIG. 5 shows the device alone.

In FIG. 5, the device 3 for through-shearing the extruded ice mass 2 is shown in perspective, as seen from below. As it appears from this figure, the upper knife 4 can be provided with a V-shaped knife-edge 4' and the lower knife 5 is provided with a straight knife-edge 5'.

The rotor means 10, working as a "crank", pulls the knives 4, 5 forward and backward and the electromagnet brake/coupling 11 controls when the knives 4, 5 start and stop. The rotor means moves a full cycle (360°). The coupling means receives a signal with a given frequency for when a through-shearing is to begin, and depending on the time interval between these signals, the thickness of the ice slice which is cut is controlled. Preferably, a signal provider (not shown) is also arranged recording when a knife 4, 5 is in a start or stop position. This signal is used for activation of the coupling means for braking/engaging the knives 4, 5. As shown in FIG. 5, a gear mechanism 14 is arranged in connection with the lower knife 5, which causes the knife 5 to almost stop while the upper knife 4, which is connected to the gear mechanism 15, cuts the ice slice 6. The gear mechanisms 14, 15 are constructed in such a way that they return the knives 4, 5 simultaneously.

Above, the invention is described in relation to an example of an embodiment. It is, however, in connection to the invention, realized that equivalent embodiments such as, e.g., other types of mechanical guides and controls of the movements of the knives could be provided without deviating from the fundamental idea of the invention as specified in the appended patent claims.

The invention claimed is:

1. A device for producing individual ice cream product pieces by through-cutting of an extruded ice cream mass, comprising an ice cream extruder having a nozzle out of which the ice cream mass is extruded, and a cutting means located immediately after the nozzle for cutting up the extruded ice cream mass into said product pieces which fall down on a receiving device for further processing, wherein the cutting means comprises:

a first knife, which is reciprocably arranged in a transverse, first plane immediately after the outlet of the nozzle and arranged to perform a first transverse stroke with a first stroke length, a second knife which is reciprocably arranged in a second plane which is parallel to the first plane, the second plane being arranged immediately below the first plane with respect to the flow direction out of the nozzle, the second knife cooperating with the first knife for through-cutting the extruded ice cream mass and being arranged to perform a second transverse stroke with a second stroke length which is smaller than the first stroke length of the first knife, and means for simultaneous reciprocation of the first knife and the second knife.

2. A device according to claim 1, comprising means for control of the movements of the knives, so that the first knife is guided in the first transverse stroke, which consists in a complete through-cutting of the ice mass, and that the second knife, in a simultaneous movement, is guided partly through the ice mass in said second transverse stroke of which the direction of movement is opposite the direction of movement of the first transverse stroke.

3. A device according to claim 2, in which the first knife and the second knife are arranged on parallel guides of a frame of the means for control of the movements of the knives with opposing inactive positions of the knives arranged on each side of a path extending from the nozzle for the ice cream mass which is extruded from the nozzle.

4. A device according to claim 3, in which the means for simultaneous reciprocation comprises the first and the second knives being eccentrically connected to rotor means which, by coupling means, is attached to rotating drive means, whereby a rotational movement from the drive means is transferred to the rotor means and is transformed into the respective transverse strokes of the knives.

5. A device according to claim 4, wherein the coupling means comprises a pneumatic or electric activatable coupling, and the drive means activates the coupling means for performing a through-cutting in dependency of the flow velocity of the ice mass out of the nozzle.

6. A device according to claim 1, in which the second stroke length of the second knife is half of the first stroke length of the first knife.

7. A method for through-cutting of an extruded ice cream mass which is extruded out of a nozzle, comprising the steps of:

using a cutting means which is located immediately after the nozzle to cut up the extruded ice cream mass into product pieces which fall down on a receiving device for further processing, moving a first knife of the cutting means in a transverse first stroke in a transverse first plane immediately after the outlet of the nozzle, and moving a second knife of the cutting means in a transverse second stroke in a plane which is parallel to the first plane and which is arranged immediately below the first knife with respect to the flow direction out of the nozzle, the first and second knives moving simultaneously, in which the first and second knives cooperate with one another for through-cutting the extruded mass, in which the first knife cuts completely through the ice cream mass during said first stroke, and in which the second knife cuts partly through the ice cream mass during said second stroke in which the direction of movement is opposite the direction of movement of the first stroke.

8. A method according to claim 7, in which the ice cream mass is continuously extruded out of the nozzle.

9. A method according to claim 8, in which the second stroke length of the second knife is half of the first stroke length of the first knife.

10. A method according to claim 9, in which the simultaneous, oppositely directed transverse strokes of the first and the second knives are activated by engaging rotor means to which the knives are eccentrically connected, whereby a rotational movement from a drive means is transferred to the rotor means and is transformed into the respective transverse strokes of the knives.

11. A method according to claim 10, in which the first knife and the second knife of the cutting means are connected to the drive means by a coupling means, wherein the coupling means comprises a pneumatically activatable coupling which is activatable by a control means which comprises an electric and/or pneumatic control for activating the coupling for performing a through-cutting in dependency of the flow velocity of the ice mass out of the nozzle.

12. A method according to claim 7, in which the second stroke length of the second knife is half of the first stroke length of the first knife.

13. A method according to claim 12, in which the simultaneous, oppositely directed transverse strokes of the first and the second knives are activated by engaging rotor means to which the knives are eccentrically connected, whereby a rotational movement from a drive means is transferred to the rotor means and is transformed into the respective transverse strokes of the knives.

14. A method according to claim 7, in which the simultaneous, oppositely directed transverse strokes of the first and the second knives are activated by engaging rotor means to which the knives are eccentrically connected, whereby a rotational movement from a drive means is transferred to the rotor means and is transformed into the respective transverse strokes of the knives.

* * * * *